United States Patent

Schoonover et al.

(10) Patent No.: US 6,328,918 B1
(45) Date of Patent: *Dec. 11, 2001

(54) LOW PRESSURE INJECTION MOLDING OF METAL AND CERAMIC THREADED COMPONENTS

(75) Inventors: James Schoonover, Flemington; Brian Snow, Parsippany; Michael Sean Zedalis, Mendham, all of NJ (US)

(73) Assignee: Honeywell International Inc., Morris Township, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/262,412

(22) Filed: Mar. 4, 1999

(51) Int. Cl.⁷ .................................................... B29C 45/72
(52) U.S. Cl. ............................. 264/109; 264/621; 419/36
(58) Field of Search .................................... 264/109, 621, 264/328.2; 419/36

(56) References Cited

U.S. PATENT DOCUMENTS

| | | | |
|---|---|---|---|
| 4,734,237 | 3/1988 | Fanelli et al. | 264/122 |
| 5,258,155 | * 11/1993 | Sekido et al. | 264/109 |
| 5,403,373 | * 4/1995 | Kitagawa et al. | 419/38 |
| 5,746,957 | * 5/1998 | Fanelli et al. | 264/109 |

OTHER PUBLICATIONS

H.H. Selby et al., "Agar", Industrial Gums, Academic Press, New York, NY, 2nd ed., 1973, Chapter, p. 29.

* cited by examiner

*Primary Examiner*—Mary Lynn Theisen
(74) *Attorney, Agent, or Firm*—Roger H. Criss; Aaron Nerenberg

(57) ABSTRACT

A process for shaping threaded metal and ceramic parts from powders and molding compositions therefor is disclosed. Parts produced by this process are formed net shape without the need for machining or other finishing operations. The process comprises forming a mixture containing metal powders, ceramic powders or mixtures thereof, a gel-forming material and an aqueous gel-forming material solvent, and molding the mixture in a mold containing internal and/or external threads under conditions of temperature and pressure to produce a self-supporting threaded article.

27 Claims, 3 Drawing Sheets

LOW PRESSURE INJECTION MOLDING OF METAL AND CERAMIC THREADED COMPONENTS

FIELD OF THE INVENTION

This invention relates to a process for shaping metal and ceramic parts from powders and molding compositions therefor. More particularly, the invention is directed to molding processes and molding compositions for forming internally or externally threaded articles that can be readily fired to produce net-shape articles without the need for machining or other finishing operations.

BACKGROUND OF THE INVENTION

Threads are a convenient means of joining two or more components in a myriad of applications including industrial, automotive, aerospace, consumer and plumbing, among others. Machining is used to produce the vast majority of mating external and internal threads on metal and ceramic components. Machining is both a costly and time- consuming process for producing threaded components, and in many cases it may represent the costliest step in an entire manufacturing process.

Investment casting represents a net and near-net-shape method for forming threaded components. However, investment casting is generally a time-consuming, multi-step process that is inefficient for the manufacture of parts in high volume. Generally, some finishing operations are required to produce a finished article.

Injection molding is a preferred process for manufacturing complex, net-shape parts from metal and ceramic powders in high volume, and therefore offers considerable advantages over processes that require additional machining and finishing operations. The injection molding process is ideally suited for producing threaded articles that have desired properties without performing additional costly finishing operations.

The present invention provides a method for manufacturing metal and ceramic threaded parts by low pressure injection molding using aqueous feedstocks. More specifically, according to the present invention a process is provided for shaping threaded parts from metal and ceramic powders. The process generally comprises the following steps: introducing into a conventional injection molding machine aqueous feedstock consisting essentially of metal powders, ceramic powders or mixtures thereof, water, a binder from the family of polysaccharides known as agaroids, and optionally other additives to enhance the processability and/or stability of the material; molding the threaded part at low temperature (e.g, approximately 85° C.) and low pressure (e.g., between approximately 400 to 1000 psi hydraulic); cooling the molded part in the mold to a temperature below the gel point of the binder (e.g., approximately 37° C.); removing the cooled, threaded part from the mold; drying the part to remove the water; heating the part to a first elevated temperature to remove the binder, and then to a second elevated temperature to density the part to its final desired condition.

BRIEF SUMMARY OF THE INVENTION

The invention is directed to a process for forming a threaded article comprising the steps of forming a mixture comprising powder selected from the group consisting of pure stainless steel alloys, stainless steel alloying elements, intermetallic compounds, components of metal matrix composites and mixtures thereof, a gel-forming material and an aqueous gel-forming material solvent; and molding the mixture in a mold having threads formed therein under conditions of temperature and pressure sufficient to produce a self-supporting article. The threaded article may contain internal or external threads.

The invention also provides an injection molding process for forming a threaded article comprising the steps of forming a mixture comprising powder selected from the group consisting of metal powders, ceramic powders or mixtures thereof, a gel-forming material selected from the group of polysaccharides consisting of agaroids and an aqueous gel-forming material solvent; supplying the mixture to an injection molding machine having a mold with threads formed therein, the mixture being maintained during the supply step at a first temperature above the gel point of the gel-forming material; and cooling the mixture in the mold to a second temperature below the gel point of the gel-forming material to form the threaded article.

BRIEF DESCRIPTION OF THE DRAWINGS

The invention will be more fully understood and further advantages will become apparent when reference is made to the following detailed description and the accompanying drawings in which.

DETAILED DESCRIPTION OF THE INVENTION

Threaded metal and ceramic parts are formed according to the present invention from powder materials by injection molding at low pressure and low temperature. The powder materials used to make the metal, ceramic and metal/ceramic composite parts of this invention include metal powders, ceramic powders and mixtures thereof. As used herein, the term metal powders includes powders of pure metals, alloys, intermetallic compounds and mixtures thereof. The term ceramic powders is intended to include, without limitation, powders of such materials as oxides, borides, nitrides, silicides and carbides of metals, non-metals or mixtures thereof, and mixtures of such materials.

Figure 1:
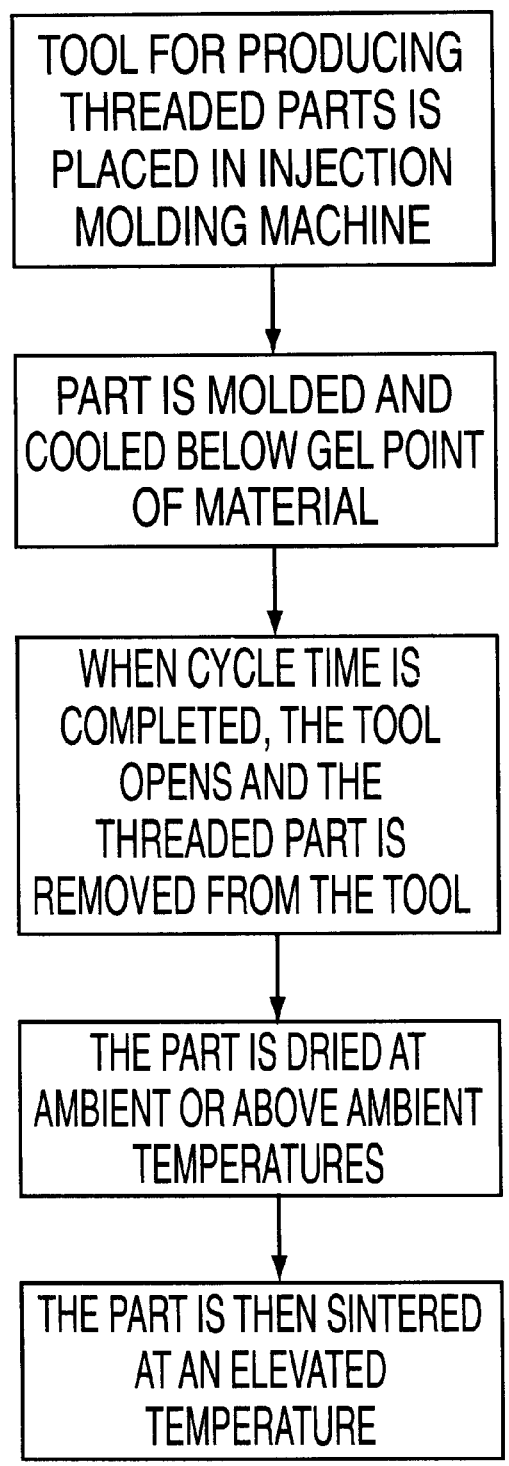
FIG. 1 is a schematic flow diagram of one embodiment of a method for the manufacture of metal and ceramic threaded components according to the present invention.

According to a preferred process of this invention shown schematically in FIG. 1, the metal and/or ceramic powder is initially mixed with a gel-forming material and a solvent for the gel-forming material. A carrier is added to this mixture in such a proportion to enable the fluidized mixture to be readily supplied to a mold by any of a variety of techniques, and especially by injection molding. The carrier can be any of a variety of liquid materials, but in the present invention water is the preferred carrier. Generally the mixture contains between about 35 to 65% by volume of powder. Preferably, the powder constitutes between about 40 to 62% by volume of the mixture, and most preferably between about 45 to 60%. The preferred and most preferred amounts are especially well suited for production of net and near-net-shape injection molded threaded parts.

The preferred gel-forming material employed in the mixture is from the class of polysaccharides known as agaroids, which are described in detail in Fanelli et al., U.S. Pat. No. 4,734,237. An agaroid has been defined as a gum resembling agar but not meeting all of the characteristics thereof (See H. H. Selby et al., "Agar", *Industrial Gums,* Academic Press, New York, N.Y., $2^{nd}$ ed., 1973, Chapter 3, p. 29). As used herein, however, agaroid not only refers to any gums resembling agar, but also to agar and derivatives thereof such as agarose. An agaroid is employed because it exhibits rapid gelation within a narrow temperature range, a factor that can dramatically increase the rate of article production. The preferred gel-forming materials are those which are water-soluble including agar, agarose and carrageenan, and the most preferred gel-forming materials include agar, agarose and mixtures thereof.

The amount of gel-forming material provided in the mixture is between about 0.5 to 6 wt % based upon the solids in the mixture. Higher amounts may be used, but while they are not believed to have any adverse impact on the process, such higher amounts of the gel-forming material may begin to reduce some of the advantages achieved by the present compositions, especially with respect to the production of net-shape and near-net- shape articles. Most preferably, the gel-forming material comprises between about 1 to 3% by weight of solids in the mixture.

The mixture further contains a gel-forming material solvent in an amount sufficient to dissolve the gel-forming material. While any of a variety of solvents may be employed depending upon the material's composition, polyhedric liquids are particularly useful solvents for agaroid-containing gel-forming materials. Polar solvents such as water or alcohols have been found to be the most useful and convenient. It is, however, most preferable to employ a solvent that is also capable of performing the dual function of a carrier of the mixture, thus enabling the mixture to be easily supplied to a mold. We have discovered that water is particularly suited to serve this dual function.

A liquid carrier is normally added to produce a homogeneous mixture and to provide the essential rheological characteristics, such as viscosity, in order to facilitate molding of the mixture by the desired molding process. Generally, the liquid carrier is between about 40 to 60% by volume of the mixture depending upon the desired viscosity. In the case of water used as a liquid carrier for mixtures containing agaroids, the water content is between about 35 to 60% by volume of the mixture, with amounts between about 40 to 55% by volume being preferred. An additional advantage of using water as the liquid carrier/material solvent is that because of its low boiling point, water is easily removed from the article being molded prior to and/or during firing.

The mixture may also contain a variety of additives that can serve any number of useful purposes. For example, dispersants and coupling agents may be employed to ensure a more homogeneous mixture. Biocides may be used to inhibit bacterial growth in the molding compositions, particularly if they are to be stored for a long period of time. A gel strength enhancing additive may be employed to further improve the processability and yield of molded threaded parts. The preferred gel strength enhancing agents are chosen from the class of borate compounds including, but not limited to, calcium, magnesium, zinc and ammonium, the most preferred being calcium borate. The gel strength enhancing compound is preferably used in an amount of approximately 0.2 to 1 wt % based on the liquid carrier.

The components of the molding formulation are compounded in a heated blender that provides shearing action thereto creating a homogeneous mixture of high viscosity. The shearing action is instrumental in producing compositions of high solids loading in a dispersed and uniform state, highly suitable for subsequent injection molding. Ability to form uniform compositions of high solids loading is desirable in the production of injection-molded parts. Use of compositions with high solids concentration results in lower shrinkages when the molded parts are dried and fired, facilitating dimensional control and mitigating the tendency for cracks to form during the densification process. The benefits afforded by this process include higher yields of acceptable product and lower scrap rates. This can have a significant effect on the cost of the overall process and may determine whether injection molding is lower in cost relative to other fabrication processes for a particular component.

Figure 2:
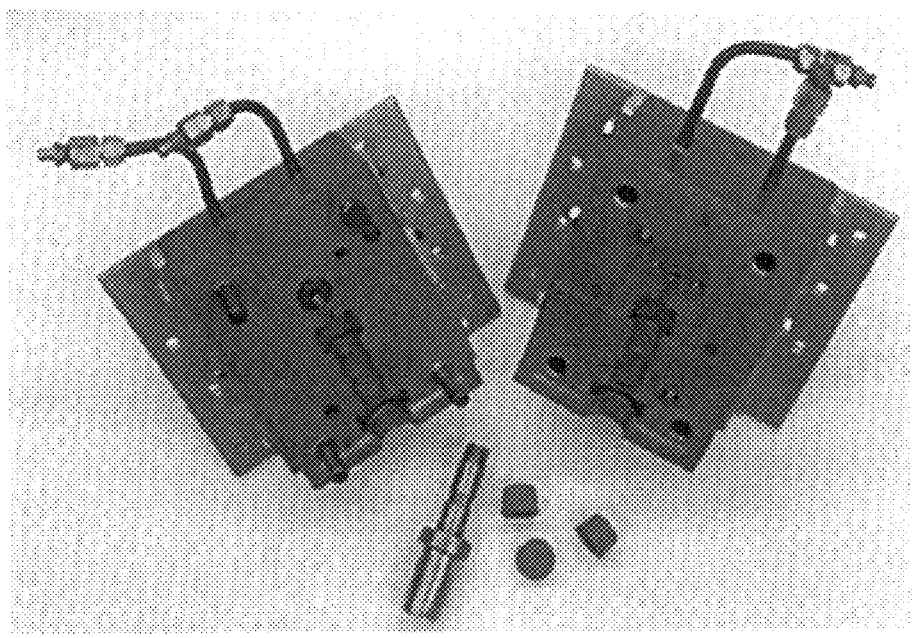
FIG. 2 is a photograph of the molds used to form externally and internally threaded parts by injection molding using aqueous stainless steel feedstock.
Figure 2:
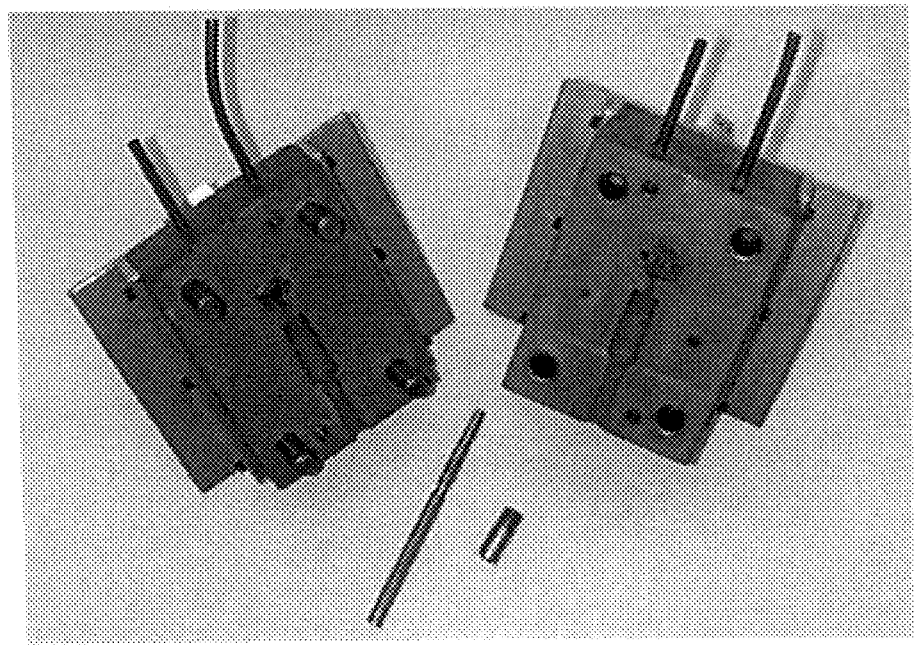

The mold for fabricating the threaded part may be made by any number of methods well known to those skilled in the art. For example, a metal mold for forming the desired threaded part may be made by machining a cavity in the shape of the desired part into a metal block. Soft tooling made of resins and particulate reinforced resins can be produced using casting techniques. In employing such a technique a cavity in the shape of the desired threaded part may be formed by casting around a master, which may be generated by any number of suitable methods well known to those skilled in the art, such as by machining or grown SLA masters. Resin, most preferably urethane or epoxy, is premixed with the reinforcement filler and cast around the master. After the resin cures to a solid, the master is removed and secondary operations can be performed to create a finished, multiple-use tool for production of parts from powder feedstock materials. Other desirable features, such as cooling lines, removable sprue and ejector systems can be incorporated in the tool if desired. Examples of molds used to manufacture the threaded parts according to the present invention are shown in FIG. 2.

The mixture is supplied to the mold by any of a variety of well-known techniques including gravity feed systems and pneumatic or mechanical injection systems. Injection molding is the most preferable technique because of the fluidity and low temperatures and pressures required to process the mixtures. These low temperature and pressure process-ing features are especially attractive in that they reduce abrasive and erosive wear of the injection molding equipment.

The mixture is supplied to the mold at a temperature above the gel point temperature of the gel-forming material. Ordinarily, the gel-point temperature is between about 10 to 60° C., and most preferably is between about 30 to 45° C.

A wide range of molding pressures may be employed. Generally the molding pressure (hydraulic) is between about 100 to 1,500 psi, although higher or lower pressures may be employed depending upon the molding technique used. Most preferably, the molding pressure is in the range of about 150 to 800 psi.

The mold temperature must, of course, be at or below the gel point of the gel-forming material in order to produce a self-supporting body. The appropriate mold temperature can be achieved before, during or after the mixture is supplied to the mold. Ordinarily, the mold temperature is maintained at less than about 40° C., and preferably is between about 15 to 25° C. Accordingly, it is expected that optimum production rates for an injection molding process would be achieved when the preferred gel-forming materials (which exhibit gel point temperatures between about 30 to 45° C.) are employed to produce a mixture, and the mixture is supplied at less than about 100° C. into a mold maintained at about 25° C. or less.

After the part is molded and cooled to a temperature below the gel point of the gel-forming material, the "green" threaded part is removed from the mold. On internally threaded parts, the part is unscrewed from an insert in the mold. Externally threaded parts are preferably made using a split mold, which is opened and the part is removed by lifting out the threaded core pin and sliding the externally threaded part off. Mold technology is well known to those skilled in the art, and consequently specific details of the mold design need not be described further.

Once the part is removed from the mold, it is dried and then fired at an elevated temperature to remove the binder and density the part. Drying may be accomplished at ambient or above-ambient temperatures. The firing times and temperatures (firing schedules) are regulated according to the powdered materials used to form the part. Firing schedules are well known in the art for a multitude of materials and need not be described herein.

Having described the invention in full, clear and concise terminology, the following example is provided to illustrate an embodiment of the invention. The example, however is not intended to limit the scope of the invention to anything less than is set forth in the appended claims.

EXAMPLE

Figure 3:
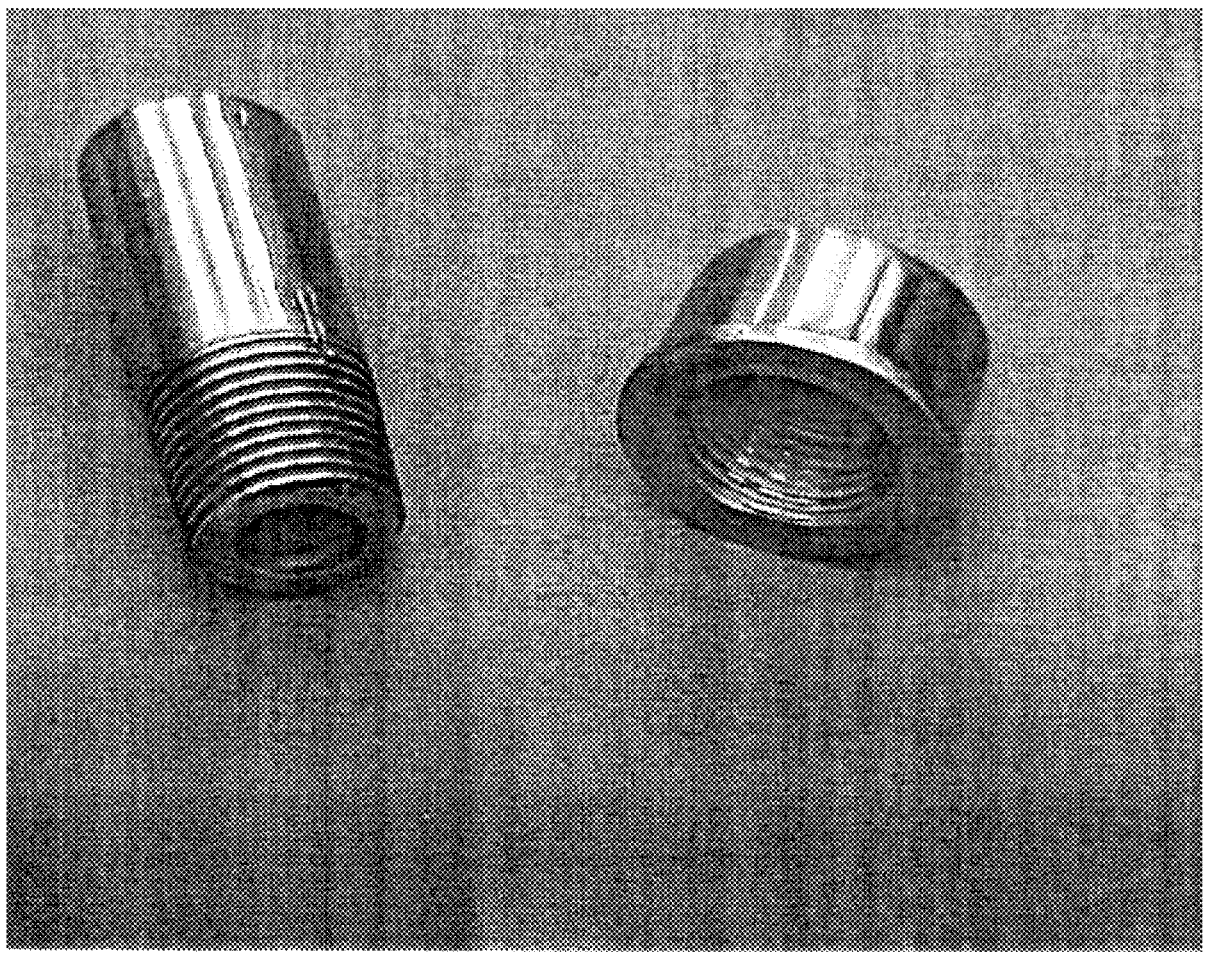
FIG. 3 is a photograph of the threaded parts manufactured according to the present invention.

Epoxy resin was premixed with aluminum filings, which made up approximately 30 vol % of the casting medium, and poured around a ½" dia. 150 lb. threaded stainless steel pipe cap master supported in a wooden form. The epoxy resin was allowed to cure undisturbed for approximately 24 hours, setting to a rigid solid. The master was then removed and the epoxy form was removed from the wood support. Secondary machining was performed on the epoxy mold consisting of metal cores, sprue bushing, nozzle passage, ejector system, venting, gating, support brackets and locating ring to allow installation on an injection molding machine. Total time for completion from tool design to molding took approximately three weeks. The mold was installed on a 55 ton, reciprocating screw injection molding machine. Pipe caps were molded from aqueous stainless steel injection molding feedstock using pressures between approximately 400 to 700 psi (hydraulic) and a barrel temperature of approximately 185° F. The mold temperature was controlled at approximately 55° F. by means of a chiller. The molded pipe caps were unscrewed from the threaded core on which they were molded. The pipe caps were then dried, heated in air and sintered using standard stainless steel sintering schedules. Utilizing a similar process, pipe nipples having matching external threads were molded, dried and sintered using the same stainless steel molding compound. The finished pipe caps and pipe nipples shown in FIG. 3 were then readily assembled and disassembled with minimal secondary finishing operations performed.

What is claimed is:

1. A process for forming an article containing threads comprising the steps of:
   a) forming a mixture comprising,
      1) powder containing at least one member selected from the group consisting of pure stainless steel alloys, stainless steel alloying elements, intermetallic compounds, components of metal matrix composites and mixtures thereof;
      2) a gel-forming material;
      3) an aqueous gel-forming material solvent; and
      4) a gel strength enhancing agent selected from the group consisting of calcium borate, magnesium borate, zinc borate and ammonium borate; and
   b) molding the mixture in a mold having threads formed therein under conditions of temperature and pressure sufficient to produce a self-supporting article.

2. The process of claim 1, wherein the gel-forming material is selected from the group of polysaccharides consisting of agaroids.

3. The process of claim 2, wherein the agaroid is agar, agarose or a mixture thereof.

4. The process of claim 1, wherein the aqueous gel-forming material solvent is water.

5. The process of claim 1, wherein the powder comprises between about 50 to 96 wt % of the mixture.

6. The process of claim 1, wherein the gel-forming material comprises between about 0.5 to 10 wt % of the mixture.

7. The process of claim 1, further comprising the step of maintaining the mixture at a temperature above the gel point of the gel-forming material prior to the molding step.

8. The process of claim 7, wherein the temperature of the mixture during the molding step is reduced to a value below the gel point of the gel-forming material.

9. The process of claim 1, wherein the mixture further comprises additives including a biocide, a coupling agent, a dispersant and monomeric mono and/or polyhedric alcohol.

10. The process of claim 1, wherein the borate compound is present in an amount up to about 10 wt % of the gel-forming material solvent in the mixture.

11. The process of claim 1, wherein the hydraulic molding pressure is less than about 1500 psi and the molding temperature is less than about 212° F.

12. The process of claim 1, wherein the article contains internal threads.

13. The process of claim 1, wherein the article contains external threads.

14. An injection molding process for forming a threaded article comprising the steps of:

a) forming a mixture comprising,
  1) powder selected from the group consisting of metal powders, ceramic powders or mixtures thereof;
  2) a gel-forming material selected from the group of polysaccharides consisting of agaroids;
  3) an aqueous gel-forming material solvent; and
  3) a gel strength enhancing agent selected from the group consisting of calcium borate, magnesium borate, zinc borate and ammonium borate;
b) supplying the mixture to an injection molding machine having a mold with threads formed therein, the mixture being maintained during the supply step at a first temperature above the gel point of the gel-forming material; and
c) cooling the mixture in the mold to a second temperature below the gel point of the gel-forming material to form the threaded article.

15. The process of claim 14, wherein the agaroid is agar, agarose or a mixture thereof.

16. The process of claim 14, wherein the aqueous gel-forming material solvent is water.

17. The process of claim 14, wherein the powder comprises between about 50 to 96 wt % of the mixture.

18. The process of claim 14, wherein the gel-forming material comprises between about 0.5 to 10 wt. % of the mixture.

19. The process of claim 14, wherein the mixture further comprises additives including a biocide, a coupling agent, a dispersant and monomeric mono and/or polyhedric alcohol.

20. The process of claim 14, wherein the borate compound is present in an amount up to about 10 wt % of the gel-forming material solvent in the mixture.

21. The process of claim 14, wherein the hydraulic molding pressure is less than about 1500 psi and the molding temperature is less than about 212° F.

22. The process of claim 14, wherein the article contains internal threads.

23. The process of claim 14, wherein the article contains external threads.

24. The process of claim 14, wherein the borate compound is calcium borate.

25. The process of claim 24, wherein the calcium borate is present in an amount between about 0.2 to about 1 wt % based on the liquid carrier.

26. The process of claim 1, wherein the borate compound is calcium borate.

27. The process of claim 26, wherein the calcium borate is present in an amount between about 0.2 to about 1 wt % based on the liquid carrier.

* * * * *